INVENTORS
EDWARD R. BRADY
MALCOLM H. GOOSEY
BY
Roland A. Anderson
Attorney:

PRIOR ART FIG-2

INVENTORS
EDWARD R. BRADY
BY MALCOLM H. GOOSEY

Attorney:

INVENTORS.
EDWARD R. BRADY
MALCOLM H. GOOSEY
BY
Attorney.

ANALOG-TO-DIGITAL CONVERTER

Filed Oct. 29, 1965

8 Sheets-Sheet 4

INVENTORS
EDWARD R. BRADY
MALCOLM H. GOOSEY

BY

Attorney

Sept. 23, 1969 M. H. GOOSEY ET AL 3,469,254

ANALOG-TO-DIGITAL CONVERTER

Filed Oct. 29, 1965 8 Sheets-Sheet 5

INVENTORS
EDWARD R. BRADY
MALCOLM H. GOOSEY

BY

Roland A. Anderson

Attorney

INVENTORS
EDWARD R. BRADY
MALCOLM H. GOOSEY
BY
Roland A. Anderson
Attorney:

INVENTORS
EDWARD R. BRADY
MALCOLM H. GOOSEY
BY
Roland A. Anderson
Attorney:

BADC (BEGIN ANALOG DIGITAL CONVERSION)
DXXB (DECIDE XX BIT)
RRCR (READOUT AND RESET CONVERTER REGISTER)
VARP (VIDEO AMPLIFIER RESTORE PULSE)
DAPA (DIGITIZE ANALOG PATH "A")

PULSE SEQUENCE IN ADC

INVENTORS
EDWARD R. BRADY
MALCOLM H. GOOSEY
BY
Roland A. Anderson
Attorney 3,469,254
ANALOG-TO-DIGITAL CONVERTER Malcolm H. Goosey, Aiken, S.C., and Edward R. Brady, Sierra Madre, Calif., assignors to the United States of America as represented by the United States Atomic Energy Commission Filed Oct. 29, 1965, Ser. No. 505,764
Int. Cl. H03k *13/00;* G08c
U.S. Cl. 340—347 2 Claims

ABSTRACT OF THE DISCLOSURE

An analog to digital converter having a circuit for adding a series of reference potentials to the analog imput and a series of sequentially operated switches for coupling the resultant potentials to a series of comparator amplifiers. Each comparator amplifier having an on-off or digital output corresponding to a single significant bit which is transmitted to a flip-flop circuit for storage and subsequent readout.

Figure 1:
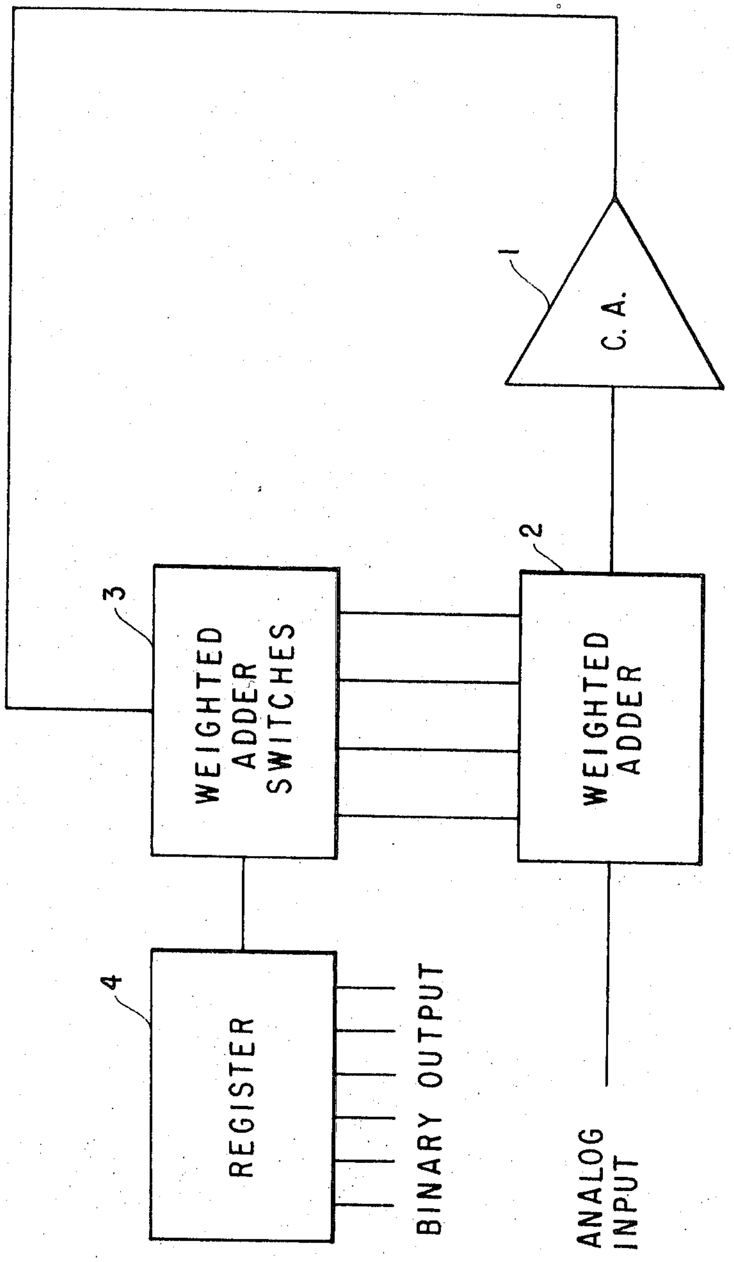
PRIOR ART FIG-1

The invention described herein was made in the course of, or under a contract with the U.S. Atomic Energy Commission.

This invention relates to analog-to-digital converters, and more particularly to an arrangement of comparator amplifiers for analog-to-digital converters.

The limiting factor on the speed of analog-to-digital conversion, herein called ADC, has been recovery time of the comparator amplifier. In the conventional ADC the weighted adder is in series with a single comparator amplifier and the bit sequence is put in or taken out of the weighted adder at the command of the comparator amplifier. Control is affected with weighted adder switches. The output binary code from the ADC is stored in the ADC registor.

Usual input voltage ranges for an analog-to-digital converter are in the vicinity of 0–5 or 10 volts. For a ten-bit device (ten binary bits resulting from full scale input) a 5 volt input swing requires that the comparator amplifier have a sensitivity of at least 2½ millivolts. During the initial portion of a conversion, it is possible for the comparator amplifier to see input voltages as great as 2½ volts, assuming no clamps on the weighted adder. This problem is somewhat lessened by the addition of clamping diodes on the input to the comparator amplifier; but even with clamps, overloads of about 240 times maximum full scale sensitivity are experienced due to the resistance of the clamps. To get minimum decision time it is necessary that the comparator amplifier operate as rapidly as possible. It must also exhibit a gain that the sufficiently high that, with the minimum input signal, there is an output voltage of sufficient magnitude to operate the weighted adder switch. During the initial portion of the digitization cycle, the comparator amplifier sees a relatively high input voltage swing. During this time the amplifier is repeatedly driven into saturation. It is then the problem of the comparator amplifier to remove itself from the saturated condition and recover to a sufficiently accurate voltage level such that it is ready to sense the next lower order bit.

The embodiment of these requirements represent a serious design problem. In order to develop a solid state comparator amplifier with recovery speed in the order of 1 to 1½ microseconds, sophisticated design techniques are required. The result is an amplifier which is extremely sensitive and very critical in terms of adjustment. In addition, transistors, by their nature display a storage time which limits the recovery time which may be expected from the overall amplifier. These delays are additive from one stage to the next. If a comparator amplifier is designed with a reasonable gain of 1000 so that a 2 millivolt input signal represents 2 volts at the output it is conceivable that this could be a three stage device. Assuming that each stage represents .3 microsecond storage time, three stages have .9 microsecond storage time. This then immediately limits the maximum speed at which this amplifier can recover to .9 microsecond, ignoring any capacitances that are in existence by virtue of circuit wiring or component contributions.

From a design standpoint, it is desirable to keep the gain of each stage as low as possible. A high speed comparator amplifier would then require more stages than three, and a compromise must be realized to maintain a sufficient gain with a rapid recovery time. Generally, this results in the addition of possibly one or two stages.

Since this amplifier does not require linearity, it is possible to design the response so that at higher input voltages the gain is reduced. This is an attempt not to saturate the device. It is, however, impossible to design the amplifier so that it will not saturate at some input voltage. The result is generally several stages of differential amplification with a power output stage.

In short, approximately .8 microseconds recovery time may be required by the comparator amplifier. An additional .2 microsecond is added by component and wiring capacities, and a final addition of approximately .5 microsecond is required for the weighted adder and other circuitry to stabilize after a step function is inserted into the system. This is a net requirement of 1.5 microseconds for circuit operation. Assuming that the frequency response of the comparator amplifier is 2 megacycles, a minimum time of .5 microsecond is required to reach a saturated condition. A further time requirement of .1 to .2 microsecsecond must be considered when setting digital circuit elements such as flip-flop or inverters. These effects add up to about 2 to 2.5 microseconds required per bit of conversion. At best, this would result in a maximum word rate in the order of 50 kilocycles.

Applicants with a knowledge of these problems of the prior art have for an object of their invention the provision of an analog-to-digital converter employing a series of switch controlled comparator amplifiers to successively decommutate the information from the weighted adder, lower the recovery time of the system, and increase the speed of signal conversion.

Applicants have as another object of their invention the provision of an analog-to-digital converter for use in a system having high speed solid state switching and employing a series of comparator amplifiers each being adapted to handle, in succession, one bit of information, thereby permitting the use of non-linear slow speed amplifiers with recovery time from saturation that may be as long as the word to be digitized, without slowing the response of the system.

Applicants have a further object of their invention the provision of a high speed analog-to-digital converter employing a plurality of sequentially operated comparator amplifiers, where storage time and component capacities are not critical, thereby simplifying the selection of components and circuitry.

Applicants have as a still further object of their invention the provision of an analog-to-digital converter employing a series of solid state switch controlled comparator amplifiers which are made operative in succession to progressively commutate analog information at high word rates, and with a minimum switch-induced pulse drop, permitting great latitude in leakage reactance and drive requirements for the switch.

Applicants have as a still further object of their invention the provision of a solid state switch controlled analog-to-digital converter to operate at high bit rates and rapid digitizing to eliminate the necessity for sample and hold.

Other objects and advantages of our invention will appear from the following specification and accompanying drawings, and the novel features thereof will be particularly pointed out in the annexed claims.

Figure 2:
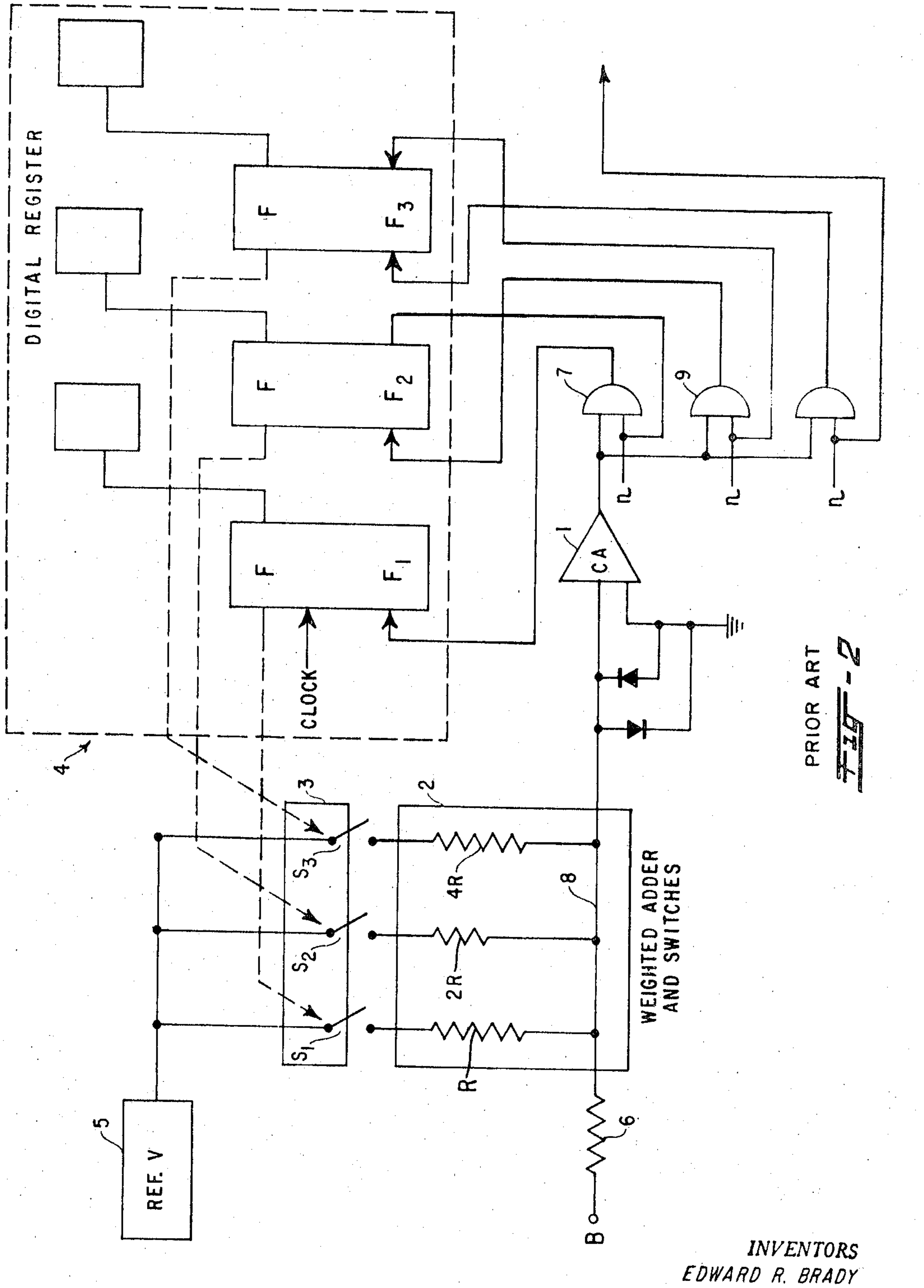
Figure 3:
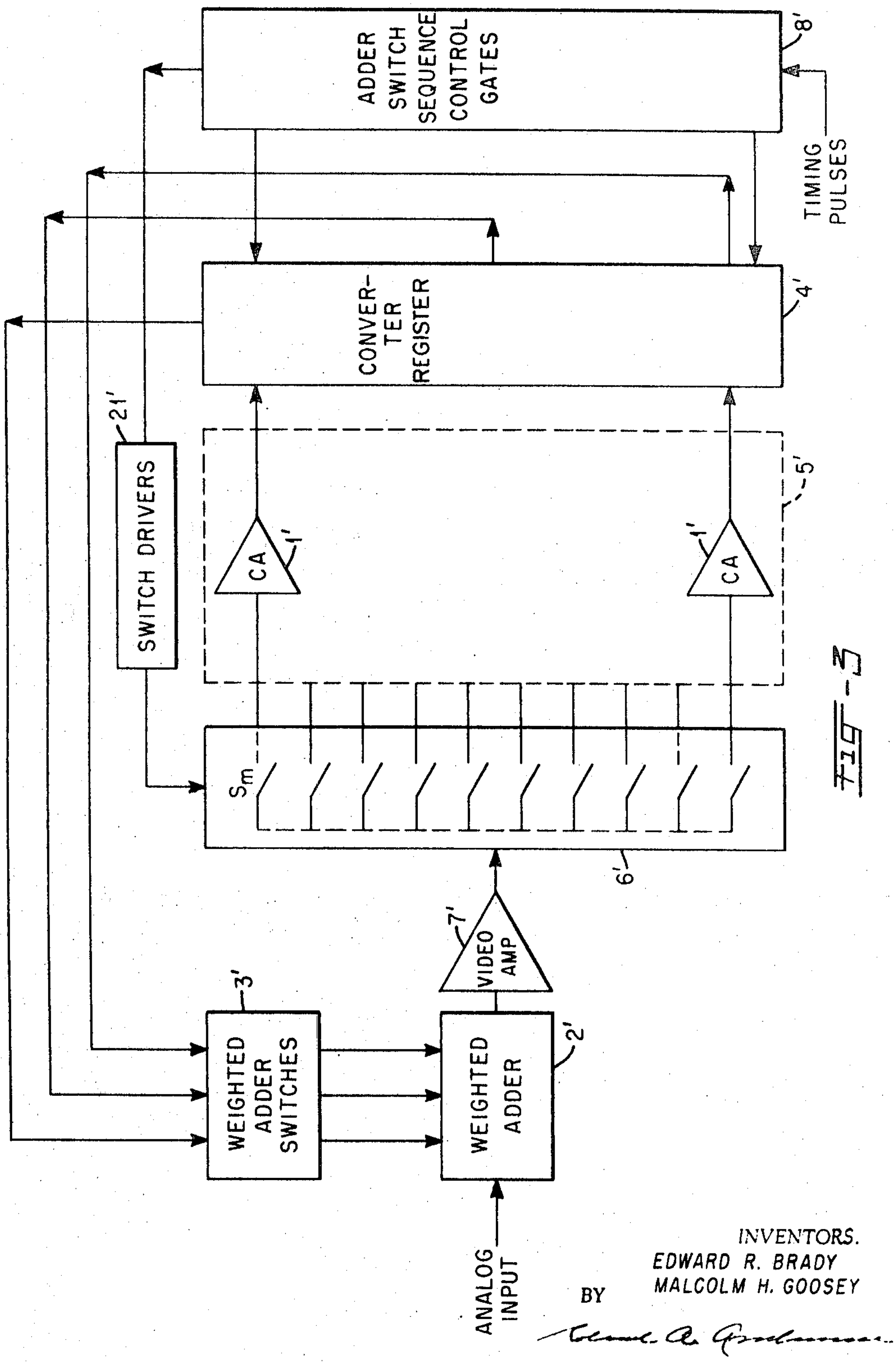
Figure 4:
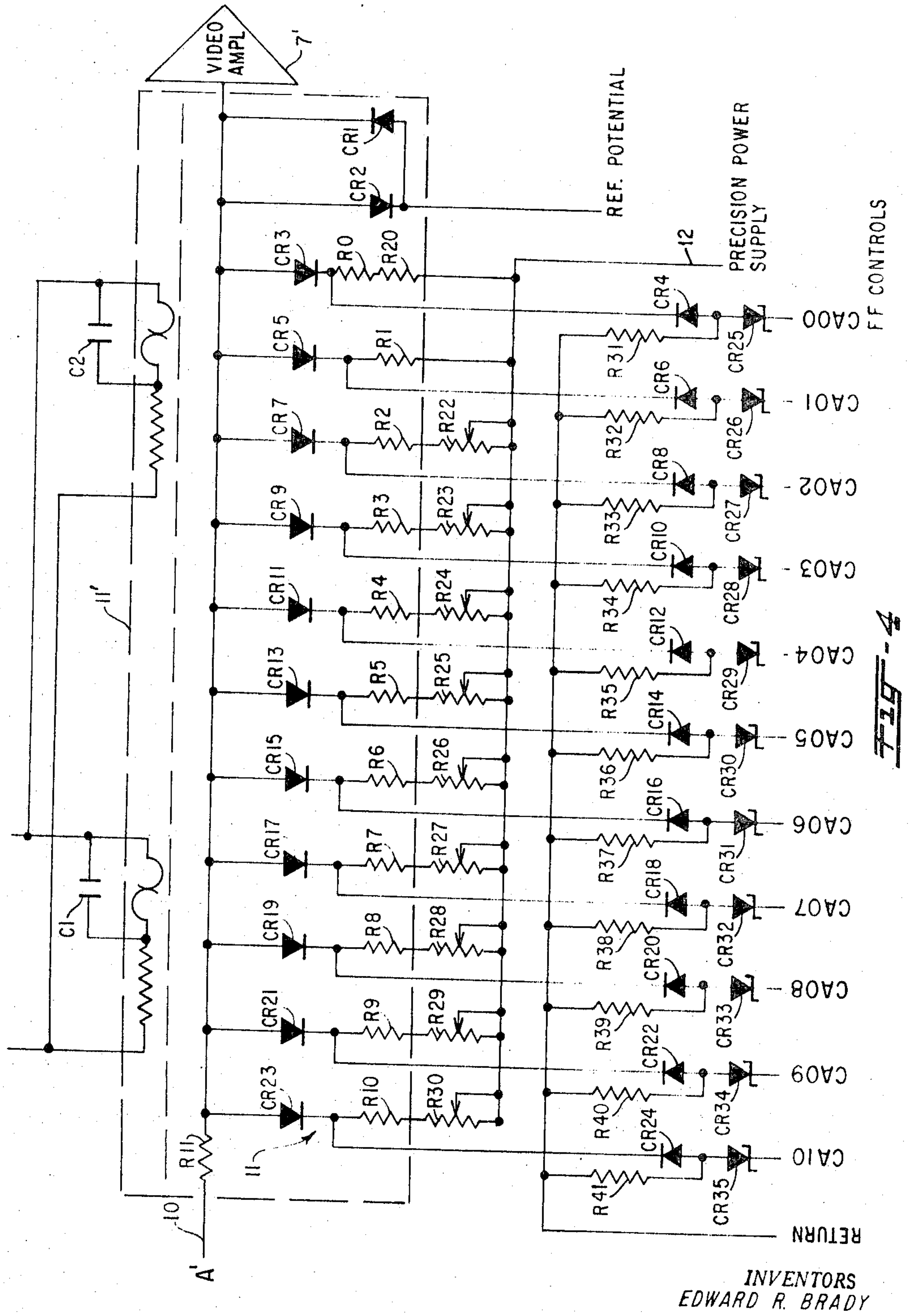
Figure 7:
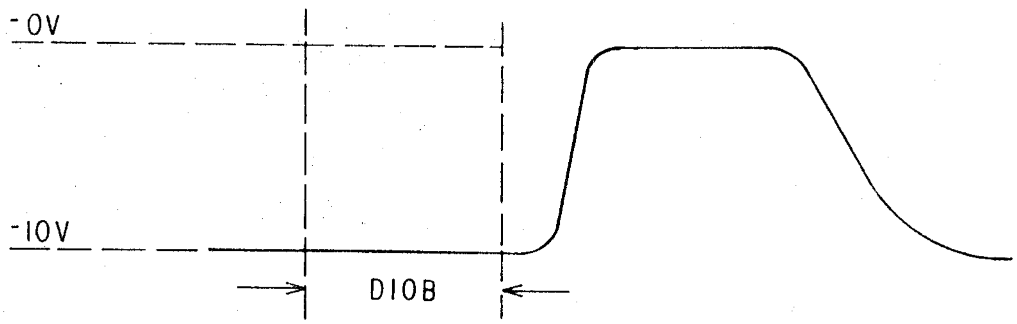
Figure 6:
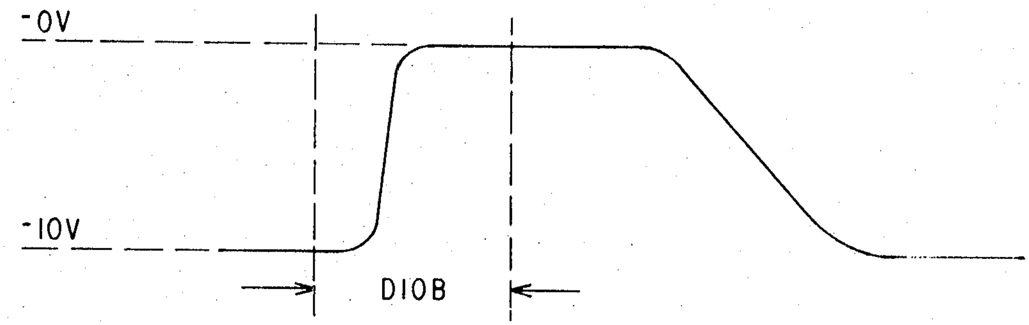
Figure 8:
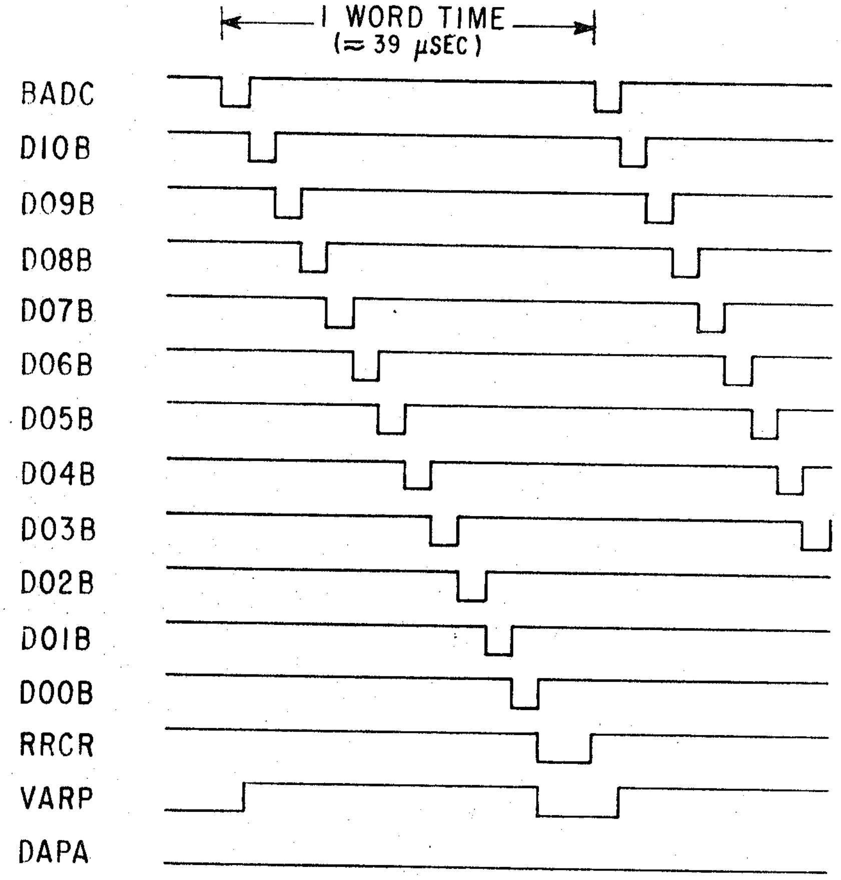

In the drawings, FIG. 1 is a block logic diagram of a prior art ADC system. FIG. 2 is a schematic circuit diagram of the comparison circuit of a conventional ADC system. FIG. 3 is a block logic diagram of our improved ADC system. FIG. 4 is a schematic of a circuit diagram of one embodiment of a weighted adder and weighted adder switches used in our improved system. FIGS. *5a* and *5b* are block diagrams of one embodiment of our improved ADC system. FIG. 6 is a graph of a typical waveform at the output of a comparator amplifier for one condition in applicants' improved system. FIG. 7 is a graph of a typical waveform at the output of the same amplifier for another condition. FIG. 8 shows the timing pulse sequence.

Referring to the drawings in detail, FIG. 1 is a conventional ADC system of the type we have improved including a comparator amplifier 1, weighted adder 2, switches 3 that control the adder, and a register 4 for holding the digital data. The single comparator amplifier 1 is coupled to the output of the weighted adder 2 and feeds back into the weighted adder switches 3, which, in turn, feed the register 4. The comparator amplifier 1 is a high gain amplifier capable of discriminating .0005 v. changes from the weighted adder 2. In the operation of a normal ADC, wherein the weighted adder is in series with a single comparator amplifier, the bit sequence is put in or taken out of the weighted adder 2 at the command of the comparator amplifier 1. This command control is handled through weighted adder switches 3. The output binary code from the ADC is stored in the ADC register 4.

The functioning of the system can best be understood from FIG. 2. Here it can be seen that the input signal at B is compared with a series of reference potentials using the "half split" conversion technique. Potentials are derived from reference source 5 and varied in accordance with the reference potentials supplied by a series of circuits that are closed in sequential order in response to comparisons made in the comparator amplifier 1. While only three switching circuits are shown for convenience, the number employed correspond to the total number of digits in the word to be formed, and the retention or removal of each circuit will determine the nature of the bit transferred to the register.

In commencing the operation, a signal pulse to be digitized appears at B, and is coupled into the weighted adder bus 8 through resistor 6. A clock pulse has set the flip-flop $FF_1$, representing the most significant bit, to close the first switch $S_1$. If 10 volts at B drives the output of amplifier 1 full scale, for example, then the weighted voltage drop across resistor R from source 5 will be one-half full scale, or 5 volts. If the signal at B turns out to be 5.5 volts, a positive signal representing the difference of .5 volt will be impressed on the input of amplifier CA–1 producing a negative signal at its output. Since the clock pulse to gate 7 is positive, a negative signal will not operate the AND gate 7 and no signal will be passed through to flip-flop $FF_1$ to reset it, so it will remain in the set position, and switch $S_1$ will remain closed. However, the trailing edge of the clock pulse applied to AND gate 7 will set flip-flop $FF_2$ to close switch $S_2$ and apply the voltage across resistor 2R of 2.5 volts, which, added to the most significant bit voltage of 5 volts, exceeds the input signal of 5.5 volts. A negative signal is applied to the input of the CA–1 which produces a positive signal at the output, which when applied to AND gate 9 with the positive clock pulse, operates the flip-flop $FF_2$, and opens switch $S_2$ to remove the second bit voltage. The trailing edge of the clock pulse is applied to flip-flop $FF_3$ and operates it to close switch $S_3$ and set the third bit voltage of 1.25 volts across resistor 4R. Here again, this added to the most significant bit of 5 volts is 6.25 volts and exceeds the signal voltage. It is also removed in the same manner. This procedure is continued until feedback voltages are selected in the weighted adder that correspond exactly to the signal or until all of the bits are exhausted. These digits as set in the flip-flop are transferred to the register 4 which, upon being cleared by an appropriate clock pulse, produces the digitized word. The system then processes the next signal in the same manner.

The single amplifier CA–1 must be able to compare and pass all signals that fall within the selected range. However, with the advent of practical solid state circuitry, which is accurate at high speed operation, an ADC that will convert at high speed becomes possible. In order to overcome the problems that are inherent in high speed analog-to-digital conversion, applicants have developed a system employing a series of comparator amplifiers, each amplifier driven by a solid state switch for decommutating the weighted adder information.

Referring to FIG. 3, which is a block diagram, block 2' is a weighted adder of binary weighted ladder resistance network type. Block 6' is a group of solid state switches which are driven by drivers 21'. Block 5' depicts a group of comparator amplifiers 1', and block 4' is the converter register. Block 8' contains the adder switch sequence control gates that control the weighted adder switches 3' and the group of switches 6' for the amplifier 5'.

The weighted adder as outlined here is defined as a binary weighted resistance ladder. It is controlled by means of diode or transistor switches. For purposes of speed a diode weighted adder switch will be considered. The solid state switches used are transformer driver solid state switches of the Shockley type, Patent No. 2,891,171, with capacitance neutralization incorporated within the switch. These switches will operate as fast as .5 microsecond sample time. The preferred comparator amplifiers used are devices which will accept a voltage input of 2 to 3 millivolts and exhibit a gain of approximately 2000.

The switch sequence control gates 8 may be any digital logic suitable for turning on or turning off the solid state switches 6' as a control for the specific comparator amplifiers used.

The operation is as follows: A voltage is supplied to the weighted adder 2' in an analog form to be digitized. This voltage is modified in a digital fashion and passed through the weighted adder bus to a video amplifier 7' of broad band and low gain. This video amplifier may be considered part of the weighted adder and serves the purpose of isolating the weighted adder from the comparator amplifier bus. The voltage as observed on the comparator amplifier bus is commutated in a cyclic fashion to the comparator amplifiers 5'. Each amplifier 1' represents one bit of the resulting binary code. As the most significant bit switch $S_m$ of group 6' is closed, that particular comparator amplifier 1' sense the voltage at its input and displays either a "yes" or a "no" answer to the converter register 4'. This decision either removes or allows the bit to remain in and the bit switch is then opened. This process is continued until all of the comparator amplifiers have had voltage applied to their inputs and the result is a binary representation of the analog input to the weighted adder 2' in an analogous fashion to that described above in connection with FIG. 2.

Each solid state switch will close in less than .1 microsecond, allowing .5 microsecond for the rise time of the comparator amplifier and .1 microsecond for the ADC register. The entire decision can be made in less than 1 microsecond. The ADC will operate at bit rates as high as 1 megacycle without the necessity of using very sophisticated circuitry. In applications where environmental conditions may be extreme, this sort of device exhibits the necessary tolerance to extremes in temperature. Where high rates of speed are required this device will perform more rapidly than any other of the same class.

High rates are desirable from the standpoint of very rapid digitizing for the purpose of eliminating the necessity of sample and hold. Sample and hold circuits in a solid state form are extremely difficult to control because of current requirements of transistors. Even though the word rate of a system may be low, a high bit rate allows short conversion times and essentially eliminates the requirement for a sample and hold device.

Figure 5A:
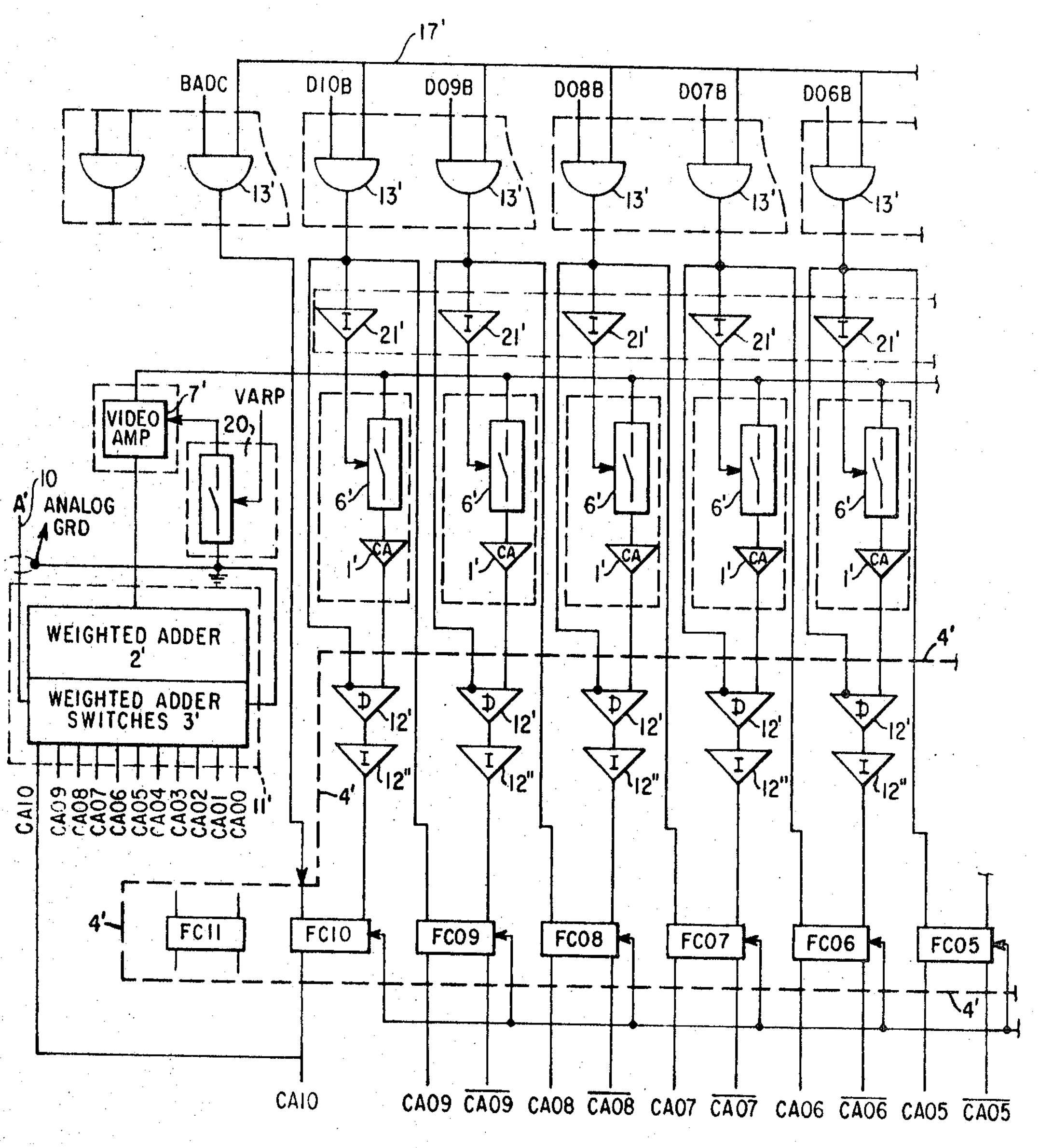

FIG. 4 is a schematic circuit diagram of the weighted adder 2′ and weighted adder switches 3′ of the block diagram of FIG. 5*a*, which constitutes a preferred embodiment of our invention. Since the "half split" conversion technique used in applicants' signal comparison system is known, only a representative number of sections of the resistance ladder of the weighted adder and adder switches, shown in FIG. 4, will be described. This will serve to avoid repetition, for in an 11-bit weighted adder the network section is duplicated 11 times.

This embodiment of ADC has the diode switches 3′ housed in a constant temperature oven 11′ and produces an 11-bit parallel output in straight binary code from pulse amplitude modulated signals which appear at input A′ of bus 10.

The total time for digitization, including the amplifier restoring operation, is normally 40 microseconds.

Figure 5B:
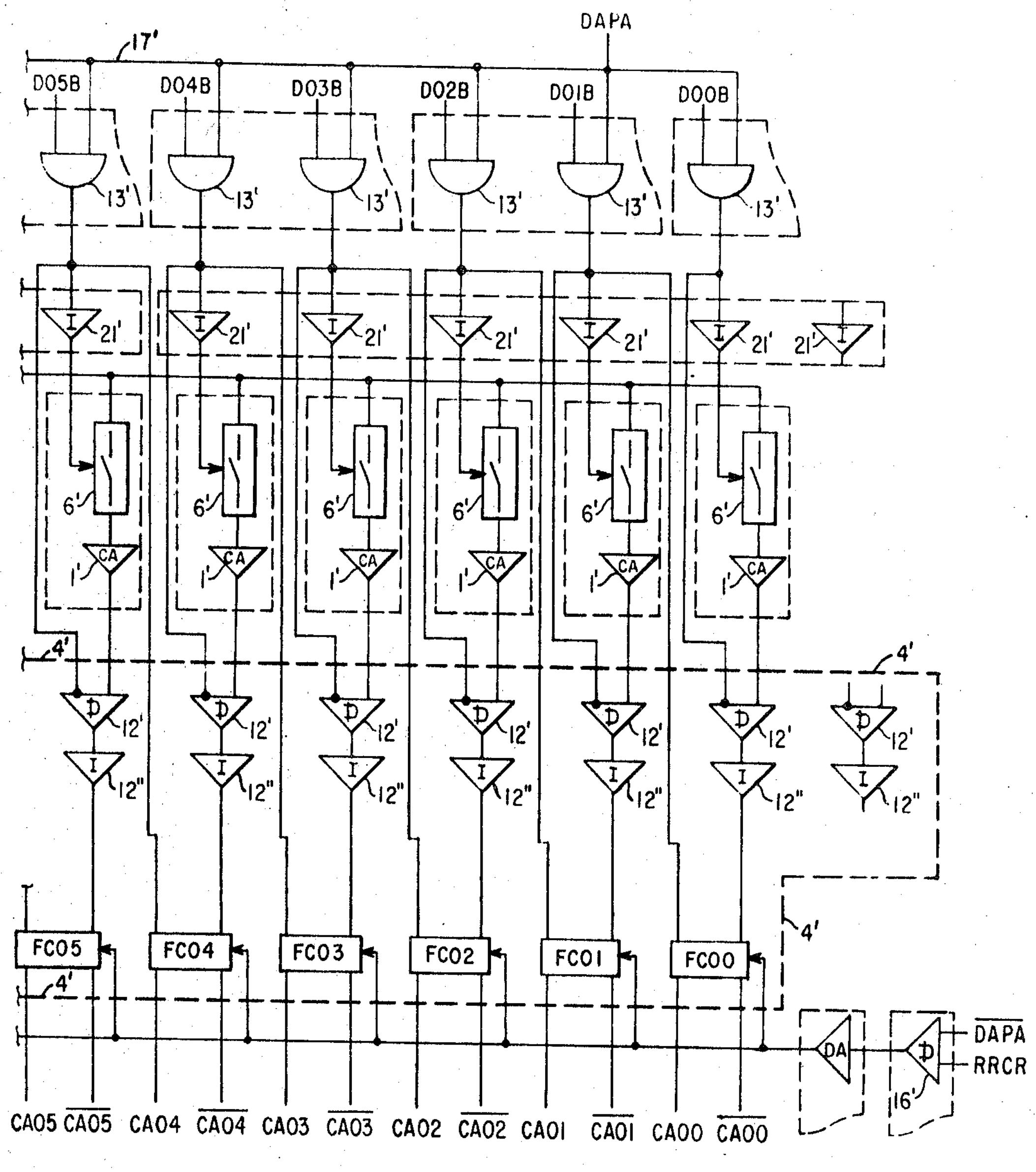

Clamping diodes CR-1, CR-2 are coupled to a reference potential of −2.38 volts and are connected to bus 10 to prevent excessive swings of the input to video amplifiers 7′. The reference voltage from "precision power supply" is −10 volts and is coupled through line 12 to the various network sections. Considering the first section 11, with no signal on bus 10 or at CA–10 diode CR–24 will be conducting, and current flowing through resistors R–10, R–30 will be diverted from the weighted adder bus. The same situation exists in the other ten network sections. As shown in FIGS. 5*a*–5*b*, the weighted adder switches 3′ are coupled to and controlled by signals CA10, CA09–CA00 from flip-flop circuits FC10–FC00 of the control system 4′. Also the output of the weighted adder 2′ and the video amplifier 7′ are coupled through solid state switches of group 6′ to comparator amplifiers 1′ whose outputs are coupled through gates 12′ and drivers 12″ to flip-flop FC10–FC00. The outputs of AND gates 13′ are coupled through drivers 21′ to the solid state switches 6′, 6′ for controlling the selection of comparator amplifiers 1′, 1′. The AND gates 13′, 13′ are shown coupled through lead 17′ to one input (DAPA) to a multiplexer (not shown) which can be used to select this ADC or another, if redundant circuits are desired, and the other input of the AND gates is coupled to a timer or source of clock signals D00B–D10B, such as a ring counter (not shown) pulsed by a pulse generator for providing pulses to close the various solid state switches of group 6′ and sequentially connect each of the comparator amplifiers 1′ to the output of the video amplifier 7′. Gates 12′ provide a "1" output only when the input to them from the gates 13′ is a "1" and the other input is a "0."

The timing pulse sequence fed to gates 13′ and other parts of FIGS. 5*a*–5*b* is shown in FIG. 8, with the legend for the pulses referring to connections shown in FIGS. 5*a*–5*b*.

In its operation, the pulse amplitude modulated D.C. input signal is fed to a weighted adder summation bus 10 at A′ and the output is fed to video amplifier 7′ whose output is in turn switched to one of eleven comparator amplifiers. The outputs of these comparator amplifiers 1′ are used to determine the states of flip-flops in a digital storage register 4′. The outputs of these flip-flops are then fed back to the weighted adder, switches, as shown in FIGS. 4 and 5*a*–5*b*.

At the beginning of the digitization process for a word, all of the flip-flops in the register 4′ are reset. The signal DAPA is also supplied to line 17′ leading to AND gates 13′. The analog input is then switched on and the conversion process begins. Each of the bits of the resulting digital word is decided as described later. After the value of each of these bits has been determined and stored in the register 4′, the RRCR pulse (Readout and Reset Converter Register) reads out this digital value for either 5.55 microseconds or 8.33 microseconds. Also, during the time that this readout process is occurring, the video amplifier is being restored by a VARP pulse applied to solid state switch 20, of FIG. 5*a* (Video Amplifier Restore Pulse) from the timer. The sequence of operations for deciding the individual bits in the digitized word is as follows:

The following notation will be used in this description. $CA_n$ will refer to the comparator amplifier for the $2^n$ bit of the digital word and $FC_n$ will refer to flip-flop storing the $2^n$ bit in the digital storage register 4′.

The switch connecting $CA_n$ to the video amplifier is closed at the same time flip-flop $FC_n$ is set. This causes the input A′ to the weighted adder 2′ to change, and its output, through the video amplifier 7′ is fed back to $CA_n$. Depending upon the value of this signal, $CA_n$ either causes no action or will cause flip-flop $FC_n$ to be reset. This resetting action, if it occurs, is asynchronous but must occur between 0.5 microsecond and 2.7 microseconds (approximate values) after the time that $FC_n$ is set. In practice this action will normally occur approximately 1 microsecond after $FC_n$ is set.

In 2.78 microseconds after $FC_n$ is set, the switch 6′ connecting $CA_n$ to the video amplifier 7′ is open and simultaneously the switch to $CA_{n-1}$ is closed, thereby connecting $CA_{n-1}$ to the video amplifier. Also at this time flip-flop $FC_{n-}$ is set.

This sequence of operations is repeated once for each bit in the final digitized word. One exception occurs, however, in regard to the setting of the flip-flops. The exception is on the least significant bit of the digital word wherein no flip-flop is set at the time CA00 is disconnected from the video amplifier.

The $\overline{\text{DAPA}}$ pulse used at the negative implication gate 16′, of FIG. 5*b*, to gate the sequencing pulses to the ADC merely decides which of the two ADC's is being used for the current digitization operation. This pulse will remain at a fixed logic level during the entire digitization process and merely determines whether the ADC will run or not. For purposes herein, we assume DAPA and $\overline{\text{DAPA}}$ pulses are always present to furnish one input to AND gates 13′ and to negative implication gate 16′.

When the D.C. amplitude modulated pulse is presented at A′ in input bus 10, assume that the ADC has been reset and is ready to begin conversion. FC00 through FC09 are in the reset state and after pulse BADC, FC10 is in the set state. VARP (Video Amplifier Restore Pulse) is a binary "0" (+6 v.) and the reset side of FC10 appears as a "1" on CA10 of the weighted adder. This condition causes the anode of CR–24, of FIG. 4, to move from 0 v. to −6 v. The voltage drop across the Zener diode is approximately constant. This voltage change diverts the one-half full scale current normally flowing through CR–24 to flow through CR–23 and change the current to the summation bus 10. If the CA10 current is greater than the current flowing into the input of the weighted adder, current flow into the video amplifier decreases. If the CA10 current is less than the input current, the current into the video amplifier increases. The excursion of the potential at the input of the video amplifier is limited by diodes CR–1 and CR–2 in the weighted adder, of FIG. 4, so that saturation of the video amplifier transistors is avoided, thus keeping recovery time to a minimum.

Assuming the input current is zero, i.e., potential at the input A′ is −2.38 v., the current due to CA10 forces the potential at the input of the video amplifier 7′ in a negative direction. Following this signal through the video amplifier 7′, it will be found that this results in a decrease in the potential at the output of the video amplifier 7′. The leading edge of the D10B pulse from AND gate 13′ closes the first transistor switch 6′ that coupled the video amplifier 7′ to the comparator amplifier 1′. When this switch closes, the output potential of the video amplifier is passed by the switch. If this voltage is negative, as in the case being considered, the positive feedback causes the C.A.1' to regenerate and produce a positive pulse. A typical waveform on the output of C.A.1' is shown in FIG. 6.

The rising edge of the signal from C.A.1' passes through negative implication gate 12' and resets flip-flop FC10 since clock pulse D10B is present, turning off the CA10 current. The gate 12' is opened only during the time the pulse D10B is at a binary "1." This is necessary since the C.A.1' normally regenerates when the transistor switch on its input is opened. At typical waveform output of the C.A.1' is shown for this condition in FIG. 7. This waveform also represents the case where a positive or zero potential is applied to the C.A.1' input.

The trailing edge of D10B sets flip-flop FC09 and turns "On" the one-fourth scale current CA09 in the second network section of the weighted adder of FIG. 4. The digitizing sequence repeats for all comparison levels D09B–D00B at the end of which time the ADC register contains the binary equivalent of the input voltage, referred to —2.38 volts. Various portions of the system are D.C. restored during the next period. In particular the video amplifier 7' is restored by a VARP clock pulse (Video Amplifier Restore Pulse) applied to switch 20. Pulse RRCR (Readout and Reset Converter Register) resets the register and another cycle begins.

Having thus described our invention, we claim:

1. An analog-to-digital converter comprising a weighted adder having an input for receiving analog signals and an output for emitting resultant signals, means for providing reference potentials for combining with said analog signals within said weighted adder to produce said resultant signals, a series of nonlinear monostable comparator amplifiers having reduced gain at increased inputs for passing and amplifying resultant signals of a predetermined level, a group of solid state switches for coupling each of said comparator amplifiers to said weighted adder in sequence to receive one of said resultant signals, first AND gate means for transmitting timing control pulses to each of said solid state switches, second AND gate means correspondingly coupled to the outputs of each of said amplifiers and first AND gate means for providing digital pulses only on simultaneous receipt of signals from said corresponding comparator amplifier and said first AND gate means, and a series of flip-flops for storing said digital pulses from the second AND gate means.

2. Redundant analog-to-digital converter circuits comprising a parallel array consisting essentially of series connected resistors and solid state diode switches, a constant temperature oven housing said array, means for connecting a precision power supply to said array to provide a diminishing succession of reference potentials, bus means for combining an analog signal with said reference potentials to produce resultant signals, a series of nonlinear, monostable comparator amplifiers having reduced gain at increased inputs, for passing and amplifying resultant signals of a predetermined level, a group of solid state switches for coupling each of said comparator amplifiers to said array in sequence to receive one of said resultant signals, a series of AND gates corresponding one to each of said solid state switches each gate having means for receiving a circuit selector signal and timing control pulses to successively close said solid state switches after selecting one of said redundant circuits, AND gate means coupled to the outputs of said amplifiers and responsive to signals therefrom for blocking the passage of static induced comparator amplifier output, and a series of flip-flops for storing pulses from said AND gate means.

References Cited

UNITED STATES PATENTS 2,754,503 7/1956 Forbes ............. 340—347

MAYNARD R. WILBUR, Primary Examiner

G. R. EDWARDS, Assistant Examiner